United States Patent [19]
Akhter

[11] Patent Number: 4,961,018
[45] Date of Patent: Oct. 2, 1990

[54] ENCLOSED PUMP MOTOR AND WIRING THEREOF

[75] Inventor: Pervez Akhter, Fort Wayne, Ind.

[73] Assignee: Wayne/Scott Fetzer Company, Fort Wayne, Ind.

[21] Appl. No.: 393,399

[22] Filed: Aug. 11, 1989

[51] Int. Cl.$^5$ .................... H02K 7/08; H01H 35/40; H01R 13/52; F04B 49/04

[52] U.S. Cl. ............................. 310/87; 310/71; 310/89; 417/422; 439/275

[58] Field of Search .................. 310/71, 87, 88, 89; 417/40, 36, 422; 439/271, 273, 274, 275, 277

[56] References Cited

U.S. PATENT DOCUMENTS

| | | |
|---|---|---|
| Re. 30,382 | 8/1980 | Mandell . |
| 2,320,708 | 6/1943 | Yost . |
| 2,701,529 | 2/1955 | Finzel . |
| 2,840,119 | 6/1958 | Gavin ............................. 417/422 |
| 2,918,016 | 12/1959 | Olson . |
| 3,046,900 | 7/1962 | Pollak . |
| 3,136,258 | 6/1964 | Bood . |
| 3,170,407 | 2/1965 | Johnson . |
| 3,187,675 | 6/1965 | Vejde . |
| 3,269,322 | 8/1966 | Lotspih . |
| 3,303,785 | 2/1967 | Pearce . |
| 3,327,144 | 6/1967 | Double ............................. 310/87 |
| 3,568,121 | 3/1971 | Nash . |
| 3,736,548 | 5/1973 | Double ............................. 310/87 |
| 3,746,472 | 7/1973 | Rupp . |
| 3,754,844 | 8/1973 | Nusser et al. ..................... 310/87 |
| 3,873,244 | 3/1975 | Jaqqi . |
| 4,021,144 | 5/1977 | Matsusaka ........................ 417/40 |
| 4,396,353 | 8/1983 | MacDonald . |
| 4,437,811 | 3/1984 | Iwata et al. . |
| 4,862,026 | 8/1989 | Riback ............................. 310/89 |

FOREIGN PATENT DOCUMENTS

1946158  3/1971  Fed. Rep. of Germany ...... 439/275

Primary Examiner—Steven L. Stephan
Assistant Examiner—D. L. Rebsch
Attorney, Agent, or Firm—George Pappas

[57] ABSTRACT

An enclosed pump motor includes an aluminum housing made by an impact extrusion process. The housing is cylindrical having an integrally-formed closed end with integral fastener bosses for attaching a pump thereto and an integrally-formed thickened cylindrical portion defining a shaft bore for receiving the motor shaft. At the other end, the cylindrical housing is open for receiving the motor. A motor cover is attached to the motor receiving end of the housing by crimping or bending a part of the housing into indents formed in the housing. The motor cover includes a threaded bore adapted to receive a threaded grommet wherein three connector pins are imbedded. The connector pins are connected to electrical power carrying conductors and/or switch conductors leading to a fluid level sensor switch. The conductor-to-pin connections are imbedded within the grommet and are hermetically sealed. The connector pins extend into the housing and are electrically connected to corresponding connectors leading to the electric motor.

18 Claims, 6 Drawing Sheets

ENCLOSED PUMP MOTOR AND WIRING THEREOF

TECHNICAL FIELD

The present invention relates to the technical field of enclosed or hermetically-sealed motors for use with sump pumps and utility pumps. More specifically, the present invention relates to improvements to the enclosed pump motor housing and wiring leading to the motor whereby manufacturing costs are decreased and the motor efficiency and lifespan are increased.

BACKGROUND OF THE INVENTION

Electrically powered sump pumps and utility pumps are presently widely used commercially and by households for pumping water and other fluids as may be needed. Quite often, these pumps are required to be submersed in the fluid and, therefore, require a closed or hermetically sealed pump motor. For example, a submersible sump pump is generally used by locating the pump on the floor of a sump pit and is adapted for being selectively energized and draining the sump pit as water accumulates therein. Submersible utility pumps are also quite often used for draining water from, for example, swimming pools, ponds, etc., and are submersed within the water being pumped.

Prior enclosed motors used in conjunction with sump and utility pumps, however, have substantial shortcomings and drawbacks. Quite often, the hermetic seals of the motor housing break down in a short period of time allowing water to enter the housing and come in contact with the electric motor thereby rendering the motor inoperative. Prior motor housings and components have quite often been made of steel or other materials subject to erosion or oxidation and have used paint or other coatings for inhibiting erosion thereof. However, these paints and coatings tend to chip or otherwise become detached and the motor housing and other components erode, at first, merely making the pump motor unsightly and, thereafter, potentially leaking water to the electrical components of the motor within the housing and, again, rendering the motor inoperative.

The manufacturing and/or assembly time of prior enclosed pump motors is generally quite long and significantly adds to the cost of the pump motor. Furthermore, prior pump motors require a large number of component parts and, the components themselves quite often require substantial manufacturing time and costly materials, thus, again substantially increasing the cost of the enclosed pump motor.

Accordingly, a need exists for an enclosed pump motor that, in general, is erosion resistant and wherein the seals thereof are substantially long lasting during normal submersed operation. Furthermore, a need exists for an enclosed pump motor incorporating component parts that are, in general, inexpensive and require limited manufacturing or assembly time thereby comparatively decreasing the overall cost of the enclosed motor and pump.

SUMMARY OF THE INVENTION

It is the principal object of the present invention to overcome the above-discussed disadvantages associated with prior pumps utilizing enclosed or hermetically sealed electrical motors.

The present invention overcomes the disadvantages associated with prior enclosed pump motors by utilizing an aluminum housing formed by an impact extrusion process. Other exposed component parts of the pump motor are made of polyvinylchloride (PVC) plastic and, therefore, the pump motor is substantially erosion resistant in water under normal operating conditions. Furthermore, the hermetic seals utilize 0-rings and, in combination with the non-erosive component parts and pre-designed frictional forces between the 0-rings and component parts, the hermetic seals are substantially long lasting.

The overall cost of the pump motor is substantially decreased by the utilization of the impact extruded housing which is formed with an integral closed end, integral fastener bosses, and integral cylindrical portion forming a shaft hole for receiving a seal member and the motor shaft therethrough. Furthermore, assembly time is decreased by providing a motor cover that is received within the motor receiving end of the housing and bending or crimping a part of the motor housing into indents formed on the motor cover thereby attaching and holding the motor cover on the motor housing. Further yet, connector pins connected to switch conductors leading to a float switch and/or connector pins connected directly to electrical power conductors are injection molded directly into a grommet which is threadingly received in a threaded bore of the motor cover. As can be appreciated, the direct molding of the connector pins in the grommet creates a positive hermetic seal in a generally inexpensive manufacturing manner. The assembly time for electrically connecting to the motor is also substantially decreased via a slip-fit connection between the connector pins in the grommet and mating connectors electrically connected to the motor and adapted to engage the connector pins. The various electrical connections between the conductors themselves and between the conductors and connector pins are all located within the grommet and are effectively hermetically sealed during the injection molding of the grommet. Finally, in the case of a sump pump, a support member is directly molded or formed on the motor cover for attaching thereto the conductors leading to the float switch so as to allow for cantilever motion of the float switch via a rising and falling fluid.

In one form thereof, the present invention is directed to an enclosed pump motor including a cylindrical motor housing having a motor receiving end and a closed motor shaft end. A motor shaft hole is formed in the closed motor shaft end and a motor having a motor shaft is received in the housing with the shaft extending through the motor shaft hole. A motor cover is provided on the motor receiving end of the housing and the cover has a threaded bore therethrough communicating with the interior of the housing. A threaded grommet threadingly engages and is received in the threaded bore. First and second electrical conductors are provided and, at one end, are adapted to be connected to an electrical power source. At their other end thereof, the electrical conductors extend through the grommet and are connected to the motor so as to provide electrical power to the motor.

In one form thereof, the present invention is directed to an enclosed pump motor including a cylindrical motor housing having a motor receiving end and a closed motor shaft end. A motor shaft hole is formed in the closed motor shaft end and a motor having a motor shaft is received in the housing with the shaft thereof extending through the motor shaft hole. A motor cover is provided on the motor receiving end of the motor housing. First and second electrical power conductors are provided and, at one end, are adapted to be connected to an electrical power source. The first and second electrical power conductors at their other end thereof are received in the motor cover. A fluid level sensor switch is provided along with first and second electrical switch conductors. The electrical switch conductors, at one end, are connected to the fluid level sensor switch for selective electrical contact therebetween. At the other end thereof, the first and second electrical switch conductors are received within the motor cover and, the first switch conductor is connected to the first power conductor within the motor cover. The second switch conductor and the second power conductor extend out of the motor cover and into the housing and are connected to the motor so that the motor may be selectively electrically energized.

BRIEF DESCRIPTION OF THE DRAWINGS

The above-mentioned and other features and objects of this invention and the manner of obtaining them will become more apparent and the invention itself will be better understood by reference to the following description of embodiments of the invention taken in conjunction with the accompanying drawings wherein.

Corresponding reference characters indicate corresponding parts throughout the several views of the drawings.

The exemplifications set out herein illustrate preferred embodiments of the invention in one form thereof and such exemplifications are not to be construed as limiting the scope of the disclosure or the scope of the invention in any manner.

DETAILED DESCRIPTION OF SPECIFIC EMBODIMENTS

The specific embodiments, as shown in the figures, relate to pumps and, more specifically, sump pumps and utility pumps having enclosed or hermetically sealed motors. Further, the embodiments relate to improvements to the pump motors and to the housing and wiring thereof.

Figure 1:
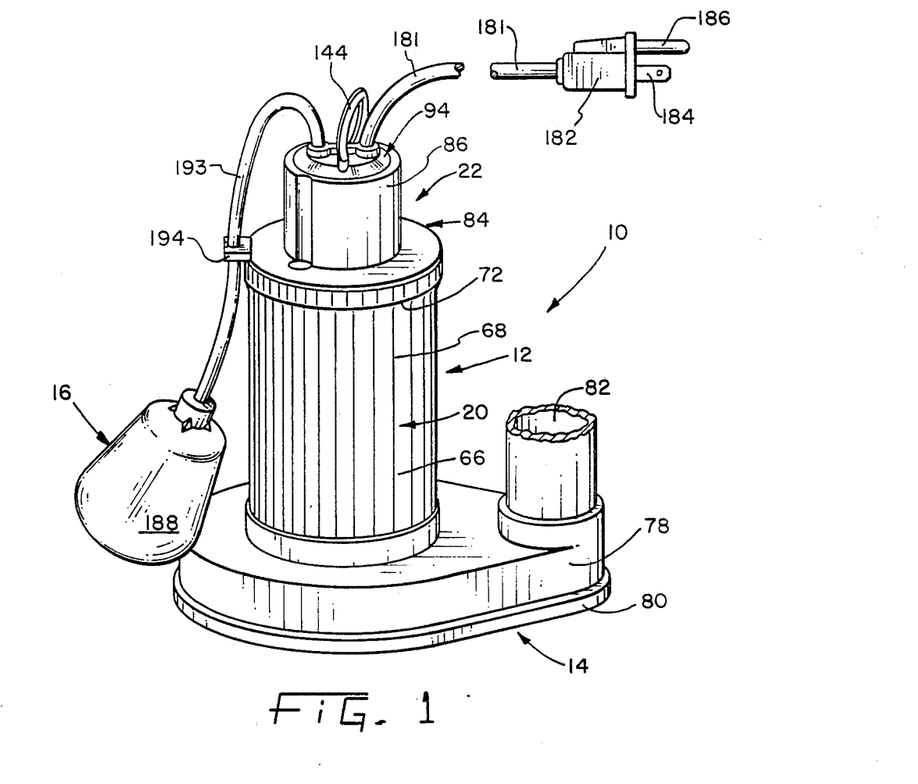
FIG. 1 is a perspective view of a sump pump and enclosed pump motor according to the present invention.
Figure 2:
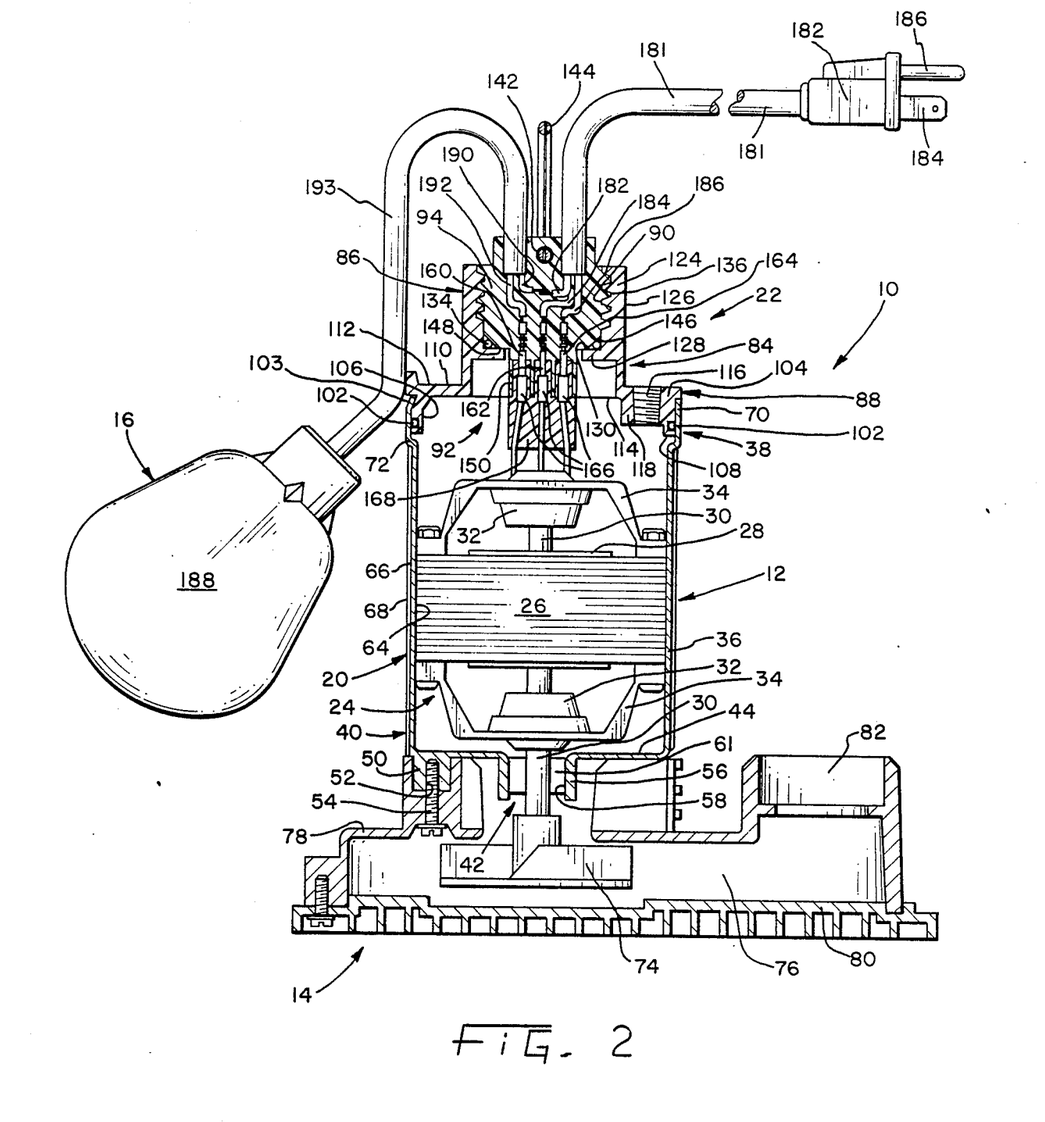
FIG. 2 is a cross-sectional elevational view of the sump pump and enclosed pump motor of FIG. 1.
Figure 3:
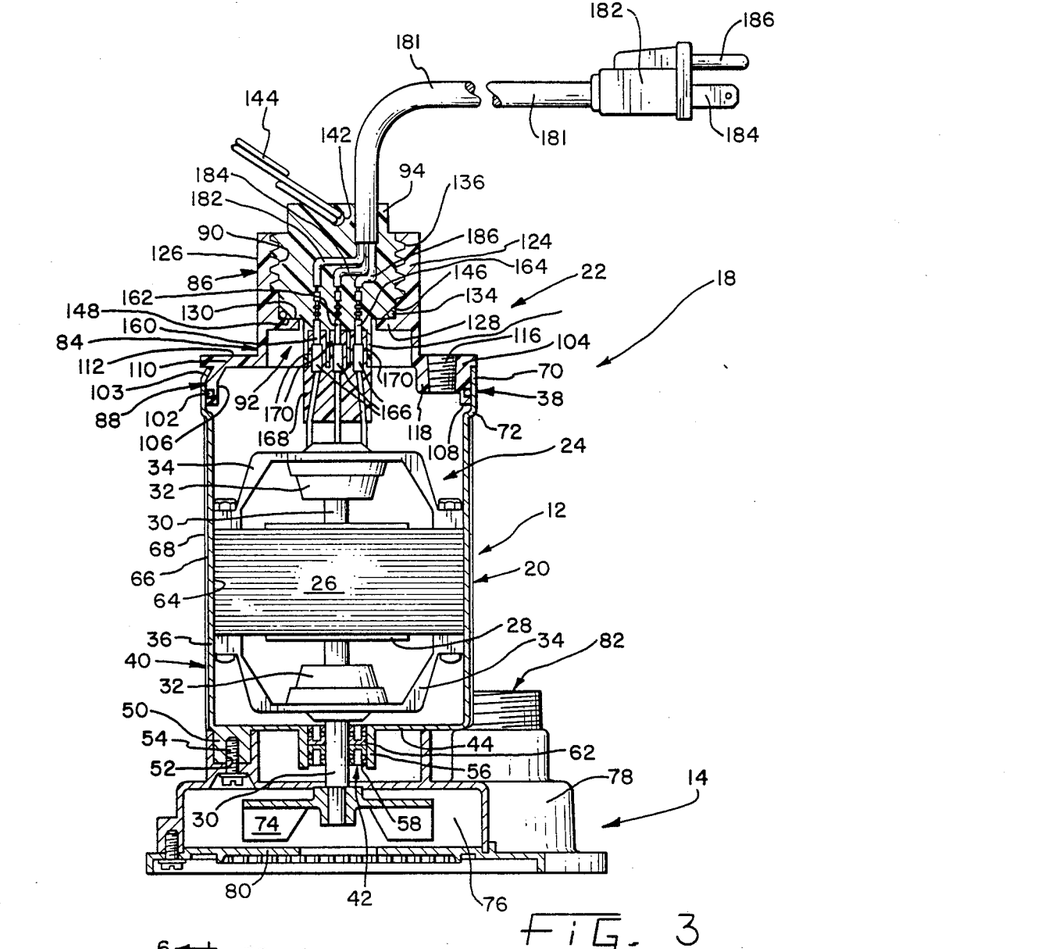
FIG. 3 is a cross-sectional elevational view of a utility pump and enclosed pump motor according to the present invention.

As shown in FIGS. 1 and 2, a sump pump generally designated as 10 includes an enclosed or hermetically sealed motor 12 drivingly engaged with pump 14. Sump pump 10 includes a fluid level sensor switch or float switch 16 adapted to cause motor 12 to be selectively energized and deenergized by the rise and fall of a fluid. The utility pump, generally designated as 18 and shown in FIG. 3, is substantially identical to sump pump 10 except that it does not include a float switch.

Both utility pump 18 and sump pump 10 include a cylindrical housing 20 and a motor cover generally designated as 22 for enclosing and hermetically sealing electric motor 24. Electric motor 24 includes a stator assembly 26 and a rotor 28 rotatably driving motor shaft 30. Motor shaft 30 is journalled in bearings 32 connected to motor frame 34 in a known and customary manner. Electric motor 24 is friction fitted within housing 20 and/or is connected thereto by other suitable means so as to prevent rotation of stator assembly 2 and motor frame 34 within cylindrical housing 20.

Figure 5:
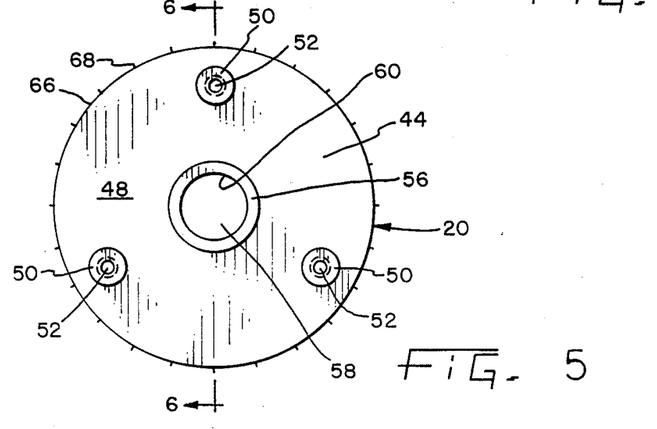
FIG. 5 is a bottom plan view of the cylindrical motor housing according to the present invention.
Figure 6:
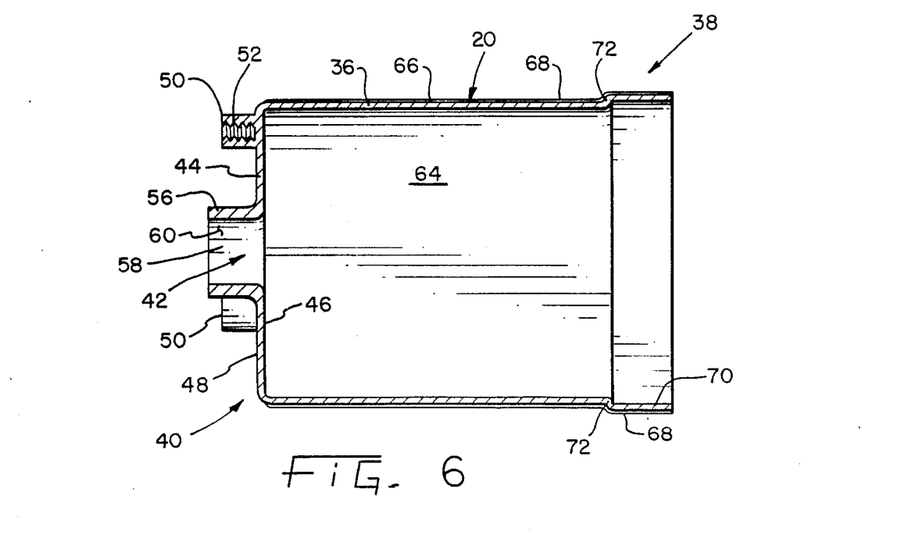
FIG. 6 is a cross-sectional view of the motor housing shown in FIG. 5 taken along line 6—6.
Figure 7:
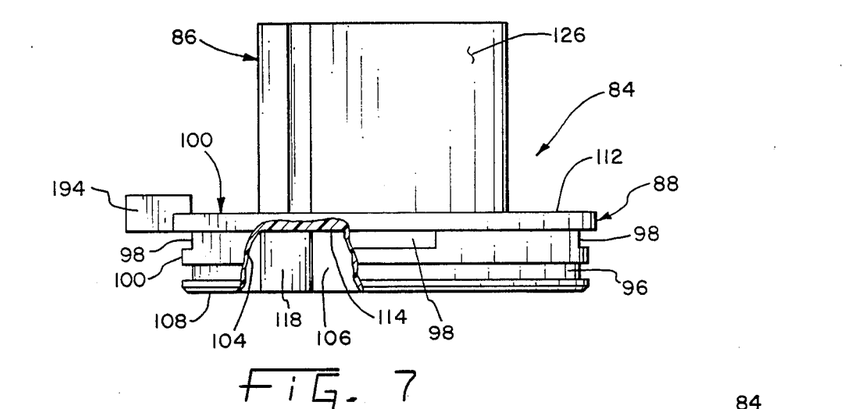
FIG. 7 is a side elevational view of the base member shown in FIG. 4.
Figures 8, 9:
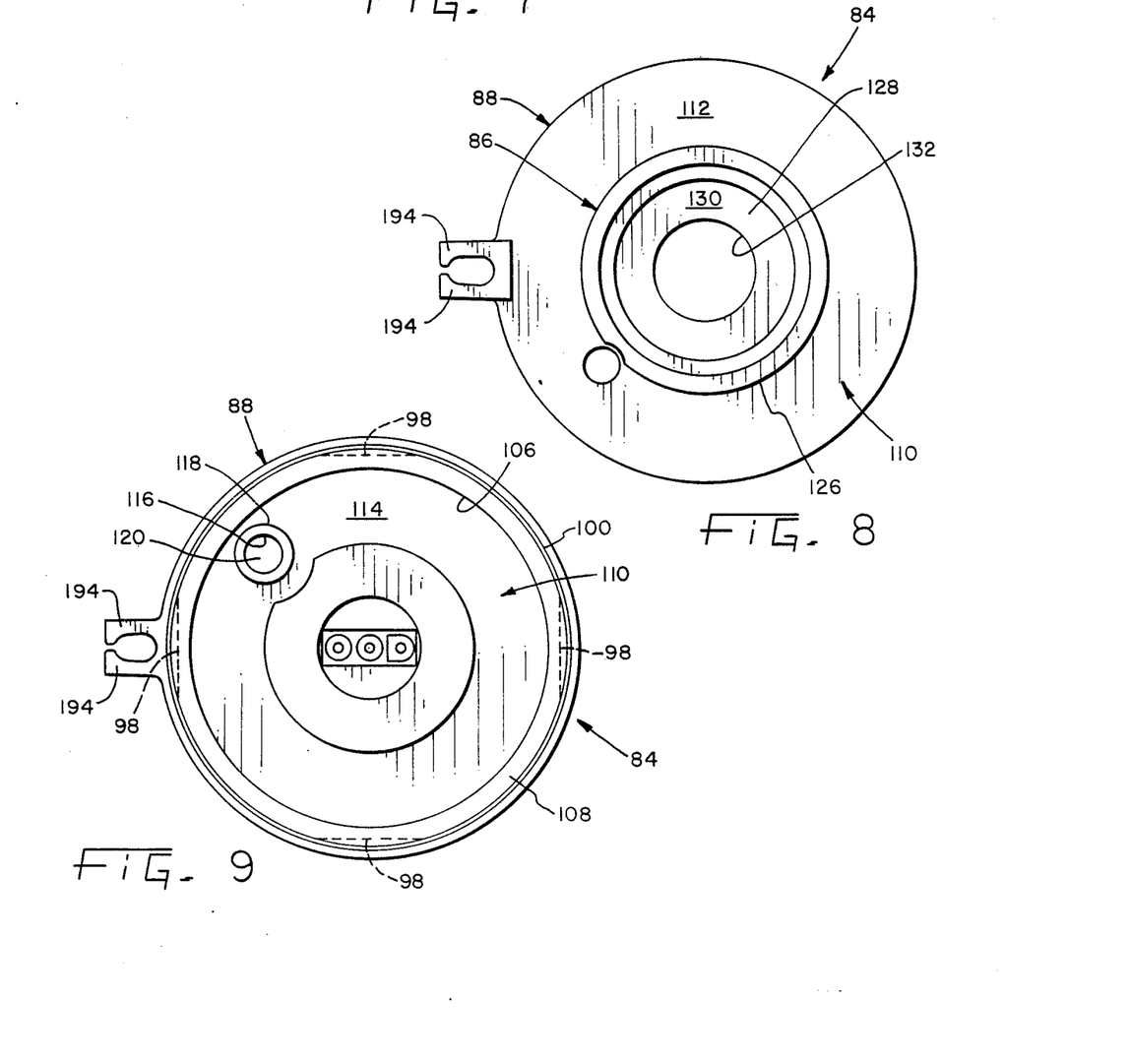
FIG. 8 is a top plan view of the base member shown in FIG. 7.
FIG. 9 is a bottom plan view of the base member shown in FIG. 7.

Cylindrical housing 20, as also shown in FIGS. 5 and 6, is manufactured by an impact extrusion process and, in general, includes the placement of a blank or slug of material in a die cavity and striking the same by a fast moving punch, forcing the material to flow back over the punch, or through an orifice of the die, or both. The metal is forced to flow under compressive forces and the final shape is normally formed in a single stroke.

Housing 20 is preferably made of aluminum, thereby being generally erosion resistant. Housing 20 includes a cylinder 36 having a motor receiving end 38 and a motor shaft end 40. Motor receiving end 38 is open, as shown in FIG. 6, for receiving motor 28 therein. Motor shaft end 40 is closed, as shown, and includes a motor shaft hole 42. Motor shaft end 40 is generally closed by disk portion 44 integrally connected or formed with cylinder 36. Disk portion 44 includes an inner surface 46 and an outer surface 48. On outer surface 48 of disk portion 44 there are integrally connected or formed, fastener bosses 50 for attaching pump 14 thereto. Bosses 50 include a screw hole 52 which may be threaded as shown in FIG. 6 or, in the alternative, unthreaded and adapted for receiving a self-tapping screw. As shown in FIGS. 2 and 3, screws 54 are used for attaching pump 14 to housing 20.

Disk portion 44 further includes a thickened cylindrical portion 56 integrally connected or formed with disk portion 44. Cylindrical portion 56 includes a cylindrical passageway 58 communicating with the interior of housing 20 and motor shaft hole 42. Thickened cylindrical portion 56 has a generally smooth interior surface 60 forming passageway 58. A seal means or member, being either a rubber cylindrical sleeve 61 as shown in FIG. 2, or a sleeve bearing 62 as shown in FIG. 3, is provided within passageway 58 of thickened cylindrical portion 56 and receives motor shaft 30 therethrough. The seal members hermetically seal cylindrical housing 20 thereat. Further, thickened cylindrical portion 56, in combination with the seal members, act to stabilize shaft 30 and thereby lengthen the life of enclosed motor 12.

Cylinder 36 includes a generally smooth inner surface 64 and an outer surface 66 having integrally formed strengthening ribs 68. At the motor receiving end 38, cylinder 36 includes a lip portion 70 adapted for crimping upon motor cover 22, as more fully described hereinbelow. Lip portion 70 is also provided for forming annular bend 72 which adds to the integrity and stability of cylinder 36. Furthermore, it should be noted that the entire housing 20 including cylinder 36, disk portion 44, thickened cylindrical portion 56, fastener bosses 50 with screw holes 52, strengthening ribs 68, and lip portion 70 are all formed by an impact extrusion process. As can be appreciated, the formation of housing 20 by a single stroke of an impact extrusion punch and die decreases the overall cost of enclosed motor 12.

As described hereinabove, pump 14 is attached to motor 12 and is driven thereby. More specifically, pump 14 includes an impeller 74 attached to motor shaft 30 and rotatably driven thereby. Impeller 74 is situated within a scroll or diffuser cavity 76 formed by upper casing plate member 78 and lower perforated plate member 80. In operation, fluid is drawn through lower perforated plate member 80 and is pushed out of pump 14 through an exit port 82.

At the other end of pump 14, motor cover 22 is provided on motor receiving end 38 of housing 20. The preferred motor cover 22, as shown in the drawings, includes a base member 84 having an upper cylindrical portion 86 integrally connected or formed with a lower cylindrical portion 88. A threaded bore 90 is formed in upper cylindrical portion 86 of base member 84 and communicates with the interior of housing 20 through opening 92. A threaded grommet 94 is threadingly received within threaded bore 90. The power and switch conductors leading to motor 24, extend into and through grommet 94 as more fully described hereinbelow. It should be noted that, in the alternative, motor cover 22 can be made of a single unitary piece with the power and switch conductors extending therethrough.

Base member 84, as more fully shown in FIGS. 4 and 7-9, includes an annular groove 96 and indents 98 on outer face 100 of lower cylindrical portion 88. Annular groove 96 is adapted to partially receive therein 0-ring member 102 as shown in FIGS. 2 and 3. 0-ring member 102 is located between the interior of housing 20 and lower cylindrical portion 88 so as to hermetically seal housing 20 circumferentially thereat.

A crimp means is provided for holding motor cover 22 onto the receiving end 38 of cylindrical housing 20. More specifically, the preferred crimp means includes a part 103 of housing 20 located on lip 70 of receiving end 38 which is bent into indents 98 in cylindrical portion 88 of base member 84. In the alternative, the crimp means can include the bending or rolling of the entire circumferential lip or tip portion of lip 70 into an annular groove formed in cylindrical portion 88 of base member 84.

Lower cylindrical portion 88 is formed by a cylindrical wall 104 having an outer face 100, an inner face 106, and chamfered circumferential edge 108. Cylindrical wall 104 is attached or integrally connected to upper cylindrical portion 86 via a flat ring portion 110 having an outer face 112 and an inner face 114. A threaded bore 116 is provided in an extension 118 which is integrally connected to the flat ring portion 110. Threaded bore 116 forms oil fill hole 120 for filling housing 20 with oil or other fluids and, is selectively hermetically sealed with a threaded oil fill plug 122 adapted to be threadingly received within threaded bore 116.

The upper cylindrical portion 86 of base member 84 is formed via a cylindrical wall 124 having an exterior wall 126 and the interior threaded bore 90. Wall 124 is connected or integrally formed with flat ring portion 110 and lower cylindrical portion 88. Within threaded bore 90 there is also provided an annular seat or ring protrusion 128. Annular seat 128 includes a seating face 130 and an inner circumferential face 132 forming part of opening 92. Seating face 130 provides a stop for grommet 94 for properly longitudinally locating grommet 94. Further, O-ring 134 located between grommet 94 and annular seat 128, acts to hermetically seal threaded bore 90 and/or opening 92.

Figure 4:
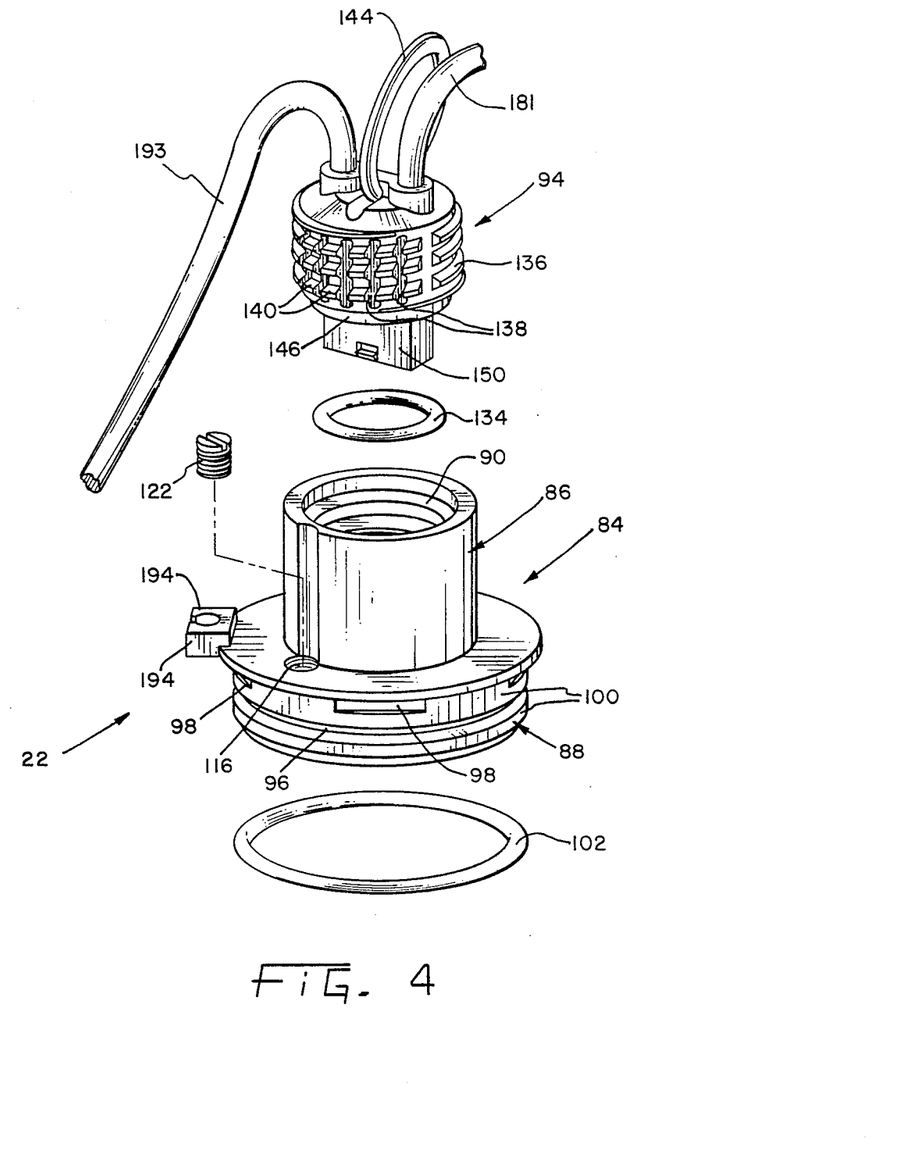
FIG. 4 is an exploded perspective view of the motor cover and showing the base member and a sump pump type grommet.
Figure 10:
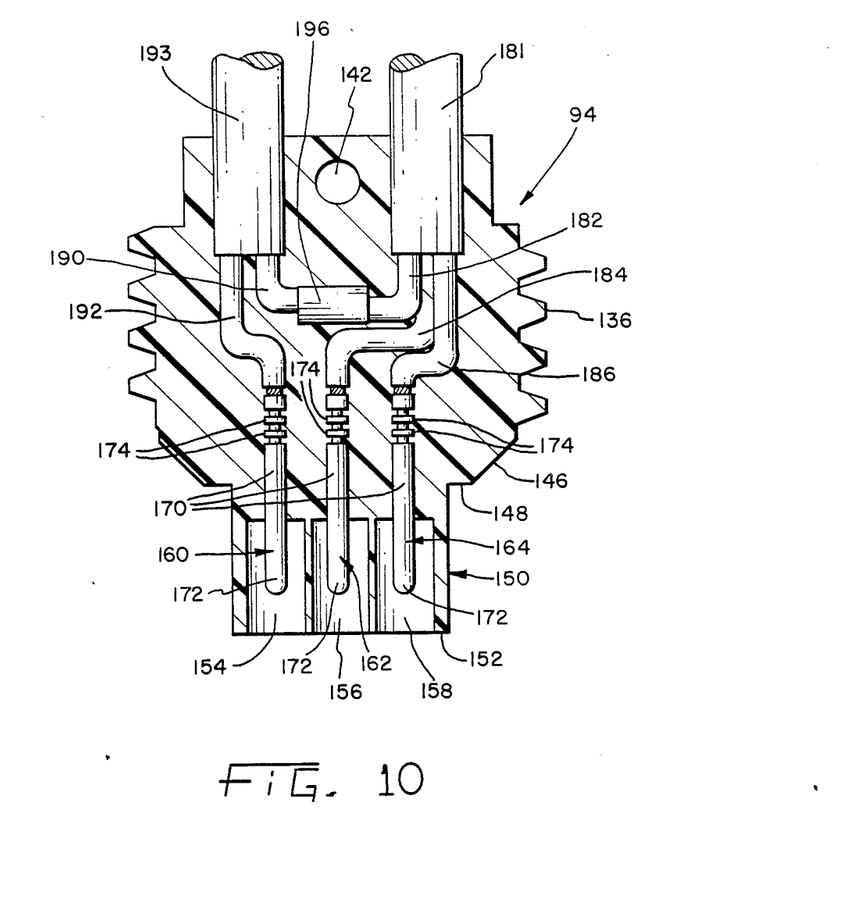
FIG. 10 is an enlarged cross-sectional view of a sump pump grommet.

Both grommet 94 and base member 84 are preferably made of polyvinylchloride (PVC) plastic and are formed by injection molding. Grommet 94, as shown in FIGS. 4 and 10, has threads 136 formed on its exterior surface adapted for mating engagement in threaded bore 90. As shown in FIG. 4, threads 136 are not continuous. More specifically, channels 138 are formed in grommet 94 generally perpendicular to threads 136, thus making threads 136 appear like a plurality of teeth 140. At the upper end of grommet 94, there is formed a ring hole 142 wherethrough carrying ring member 144 is received. As can be appreciated, carrying ring member 144 is used for lifting and carrying sump pump 10 and/or utility pump 18.

At the lower end of grommet 94, there is provided a ring portion including chamfered surface 146 and a ring surface 148 which is adapted to engage seating face 130. O-ring member 134 is provided between the ring portion and annular seat 128 and, more specifically, is located between chamfered surface 146, seating face 130 and threaded bore 90 so as to hermetically seal the threaded bore thereat.

At the lower end of grommet 94, there is integrally formed a rectangular portion 150 having a lower surface 152. Recesses 154, 156, and 158 are formed in rectangular portion 150 and extend therein from lower surface 152. A first power electrical connector pin 160, a second neutral electrical connector pin 162, and a third ground electrical connector pin 164 are all attached to grommet 94 preferably by being formed therein during the injection molding process. A portion of connector pins 160, 162, and 164 extend into recesses 154, 156, and 158 respectively and, thus, also extend into housing 20. As shown in FIGS. 2 and 3, mating connectors 166 are adapted to and engage a respective connector pin 160, 162, and 164. Mating connectors 166 are electrically conductive as are the connector pins and are formed within and retained by plastic fingers portion 168. Connectors 166 are electrically connected to motor 24 for providing electrical power thereto. As generally shown in FIGS. 2 and 3, fingers 170 of portion 168 are received within recesses 154, 156, and 158 so as to place the connector pins in mating engagement with the mating connectors.

Figure 11:
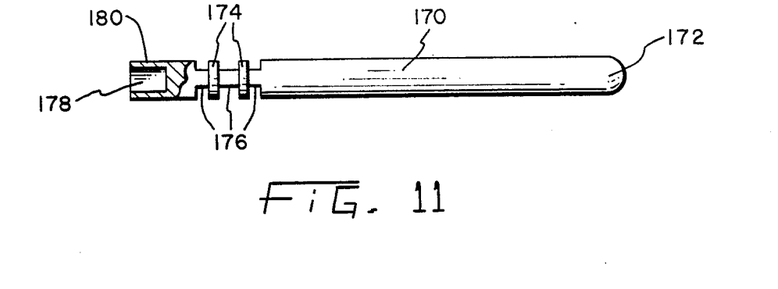
FIG. 11, is an enlarged elevational view of a connector pin with a partial cut-away portion.

As shown in FIG. 11, the connector pins are elongate rod-shaped having a body 170 and having a rounded insertion end 172. At the other end of body 170, there are formed a plurality of annular rings 174 between annular grooves 176. Both rings 174 and grooves 176 will be referred to herein as annular disturbances in view of their common function. More specifically, the annular disturbances 174 and 176 are formed or retained within grommet 94 and are completely surrounded by the PVC plastic forming grommet 94 thereby providing a hermetic seal thereat. In this fashion, during the operation of motor 24, oil within housing 20 is prevented from seeping out through around the connector pins and to the power and/or switch conductors.

An axially extending hollow 178 is also formed on the connector pins on the end opposite the rounded insertion end 172. Axially extending hollows 178 are utilized in connecting the conductors to the connector pins by partially inserting a conductor in hollow 178 and crimping the wall 180 forming hollow 178 thereby frictionally connecting the conductor within hollow 178.

A plug 182 adapted to be connected to a household receptacle or electrical power source, along with sheath 181, house a first power conductor 182, a second neutral conductor 184, and a third ground conductor 186. First connector pin 160 is connected to first conductor 182 and forms a part thereof, second connector pin 162 is connected to second conductor 184 and forms a part thereof and, third connector pin 164 is connected to third conductor 186 and forms a part thereof. As shown in FIG. 3, all said connections are sealed within grommet 94. Accordingly, electrical power is provided to motor 24 of utility pump 18 via power and neutral conductors 182 and 184 and ground is provided via conductor 186.

The wiring of sump pump 10 within grommet 94 is substantially identical to that of the grommet used with utility pump 18, FIG. 3, except that a float switch 16 is provided in the circuit in series with motor 24. More specifically, as shown in FIGS. 2 and 10, float switch 16 includes a float bulb 188 housing a switch which is selectively opened and closed, depending on the angle of the float bulb 188 and switch thereof. A first switch conductor 190 and a second switch conductor 192 are located within sheath 194 and are connected to the fluid level sensor switch 16 at one end thereof for selective electrical contact therebetween. Conductors 190 and 192 and sheath 193 are supported on motor cover 22 via a support means preferably in the form of arms 194 integrally formed or attached to base member 84. More specifically, sheath 193 is received between and is frictionally held by arms 194. Accordingly, the rise and fall of a fluid causes float bulb 188 and the switch thereof to rise and fall in a generally cantilever fashion and thereby also causes the switch to selectively open and close, depending on the level of the fluid. Switch conductor 190, at the other end thereof, is electrically connected to power conductor 182 and the second switch conductor 192 is electrically connected to connector pin 160 as described hereinabove thereby placing the float bulb switch in series with motor 24. The connection between conductors 190 and 182 is made by crimp member 196 and is located within grommet 94 so as to hermetically seal the same.

While the invention has been described as having specific embodiments, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. An enclosed pump motor comprising:
    a cylindrical motor housing having a motor receiving end and a closed motor shaft end, a motor shaft hole formed in said closed motor shaft end;
    a motor having a motor shaft received in said housing, said shaft extending through said motor shaft hole;
    a motor cover on said motor receiving end of said housing, said cover having a threaded bore therethrough communicating with the interior of said housing;
    a threaded grommet threadingly engaging and received in said threaded bore; and,
    first and second electrical conductors, at one end, adapted to be connected to an electrical power source and, at the other end, extending through said grommet and connected to said motor, whereby electrical power is provided to said motor.

2. The enclosed pump motor of claim 1 further comprising first and second electrical connector pins attached to said grommet and extending into said housing, said first connector pin connected to said first conductor and forming a part thereof, said second connector pin connected to said second conductor and forming a part thereof, and wherein mating connectors adapted for engaging said first and second connector pins and electrically connected to said motor are provided in said housing, said connector pins being in mating engagement with said mating connectors.

3. The enclosed pump motor of claim 2 wherein said grommet is made by injection molding and said connector pins are attached thereto by being partially formed therein, said connections between said connector pins and conductors being hermetically sealed in said grommet.

4. The enclosed pump motor of claim 3 wherein said connector pins are elongate rod-shaped and an axially extending hollow is provided at said one end thereof partially formed within said grommet, each of said conductor to connector pin connections made by partially inserting a said conductor in a said hollow and crimping said connector pin thereupon.

5. The enclosed pump motor of claim 4 further comprising at least one disturbance on each of said connector pins at said one end partially formed within said grommet.

6. The enclosed pump motor of claim 1 further comprising an annular seat in said motor cover threaded bore, said grommet including a ring portion adapted to engage said seat when said grommet is threadingly received in said threaded bore.

7. The enclosed pump motor of claim 6 further comprising an O-ring between said annular seat in said motor cover threaded bore and said ring portion of said grommet, whereby said threaded bore is hermetically sealed.

8. The enclosed pump motor of claim 1 further comprising crimp means for holding said motor cover on said cylindrical motor housing receiving end.

9. An enclosed pump motor comprising:
    a cylindrical motor housing having a motor receiving end and a closed motor shaft end, a motor shaft hole formed in said closed motor shaft end;
    a motor having a motor shaft received in said housing, said shaft extending through said motor shaft hole;
    a motor cover on said motor receiving end of said motor housing;
    first and second electrical power conductors, at one end adapted to be connected to an electrical power source and, at the other end, received in said motor cover;
    a fluid level sensor switch;
    first and second electrical switch conductors at one end connected to said switch for selective electrical contact therebetween and, at the other end, received in said motor cover;

said first switch conductor connected to said first power conductor in said motor cover; and, said second switch conductor and said second power conductor extending out of said motor cover into said housing and being connected to said motor, whereby said motor is selectively electrically energized.

10. The enclosed pump motor of claim 9 wherein said motor cover includes a threaded bore therethrough communicating with the interior of said housing and further comprising a threaded grommet threadingly received in said threaded bore, said first and second electrical switch conductors and said first and second electrical power conductors are received in said grommet.

11. The enclosed pump motor of claim 10 further comprising first and second electrical connector pins attached to said grommet and extending into said housing, said first connector pin connected to said second power conductor and forming a part thereof, said second connector pin connected to said second switch conductor and forming a part thereof, and wherein mating connectors adapted for engaging said first and second connector pins and electrically connected to said motor are provided in said housing, said connector pins being in mating engagement with said mating connectors.

12. The enclosed pump motor of claim 11 wherein said grommet is made by injection molding and said connector pins are attached thereto by being partially formed therein, said electrical connections being hermetically sealed in said grommet.

13. The enclosed pump motor of claim 12 wherein said connector pins are elongate rod-shaped and an axially extending hollow is provided at said one end thereof partially formed within said grommet, each of said power conductor and switch conductor to connector pin connections made by partially inserting a respective conductor in a said hollow and crimping said connector pin thereupon.

14. The enclosed pump motor of claim 13 further comprising at least one disturbance on each of said connector pins at said one end partially formed within said grommet.

15. The enclosed pump motor of claim 10 further comprising an annular seat in said motor cover threaded bore, said grommet including a ring portion adapted to engage said seat when said grommet is threadingly received in said threaded bore, and an O-ring between said annular seat in said motor cover threaded bore and said ring portion of said grommet, whereby said threaded bore may be hermetically sealed.

16. The enclosed pump motor of claim 9 further comprising crimp means for holding said motor cover on said cylindrical motor housing receiving end.

17. The enclosed pump motor of claim 9 further comprising support means on said motor cover for supporting said first and second electrical switch conductors and wherein said fluid level sensor switch is a float switch adapted to open and close at preselected angles, whereby the rise and fall of a fluid causes said float switch to rise and fall in a generally cantilever fashion and whereby said motor is selectively electrically energized.

18. The enclosed pump motor of claim 9 wherein said motor cover includes an oil fill hole for filling said housing with oil, said oil fill hole being threaded for matingly receiving a threaded oil fill plug.

* * * * *